Figure 3:
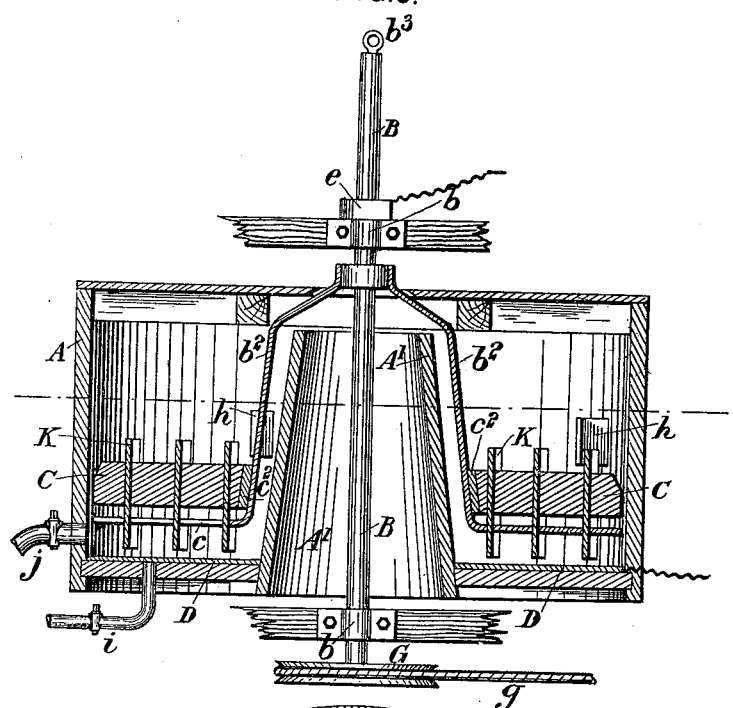

No. 627,442. Patented June 20, 1899.
L. PELATAN.
PROCESS OF ELECTROLYTICALLY TREATING ORES.
(Application filed Oct. 21, 1897.)
(No Model.) 2 Sheets—Sheet 1.
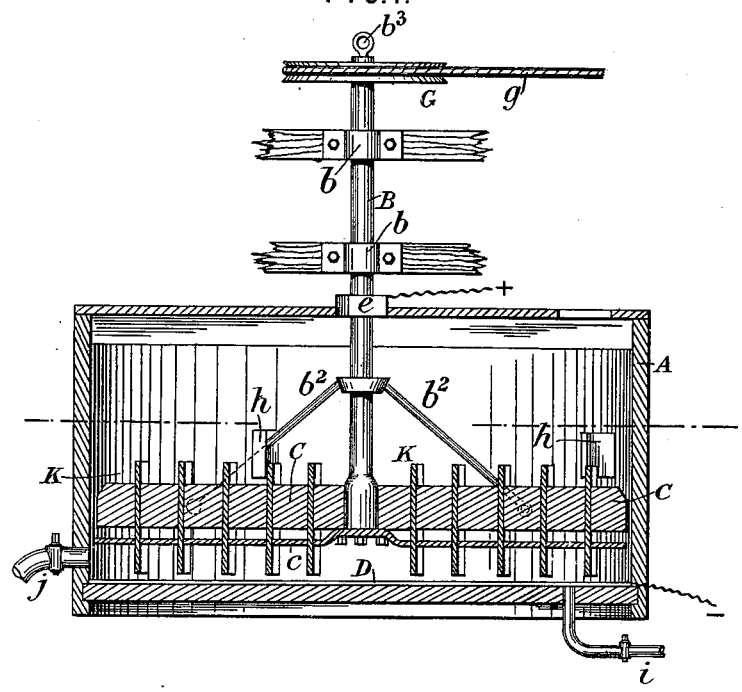
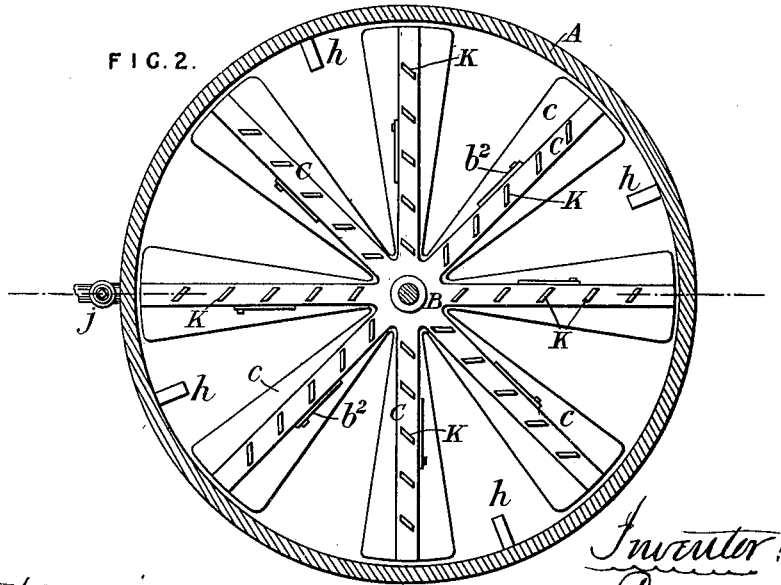

No. 627,442. Patented June 20, 1899.
L. PELATAN.
PROCESS OF ELECTROLYTICALLY TREATING ORES.
(Application filed Oct. 21, 1897.)
(No Model.) 2 Sheets—Sheet 2.

UNITED STATES PATENT OFFICE.

LOUIS PELATAN, OF PARIS, FRANCE, ASSIGNOR TO THE GENERAL GOLD EXTRACTING COMPANY, LIMITED, OF LONDON, ENGLAND.

PROCESS OF ELECTROLYTICALLY TREATING ORES.

SPECIFICATION forming part of Letters Patent No. 627,442, dated June 20, 1899.

Application filed October 21, 1897. Serial No. 655,889. (No specimens.)

*To all whom it may concern:*

Be it known that I, LOUIS PELATAN, a director of the General Gold Extracting Company, Limited, of London, a citizen of the French Republic, and a resident of 17 Boulevard de la Madeleine, Paris, France, have invented certain Improvements in Processes of Electrolytically Treating Ores, of which the following is a specification.

The object of this invention is to effect the treatment of ores or the like containing gold or silver or both gold and silver so as to obtain the precious metal therefrom in a more complete and satisfactory manner than hitherto and with considerable economy of the agents employed in the treatment. The process to which this invention relates is one in which the pulverized ore or the like is subjected to the action of a current of electricity passed through a sludge consisting of a mixture of the ore in a finely-divided condition with water and a suitable solvent of the precious metals—such, for instance, as cyanid of potassium or the like—with the addition of a salt, such as chlorid of sodium, and sometimes an oxidizing agent, the electric current being passed between a revolving anode and a cathode at the bottom of the vat in which the treatment takes place, the said cathode consisting of mercury supported upon a plate of metal which is a good conductor of electricity, such as an amalgamated copper plate.

I have discovered that the process is greatly improved if the space between the cathode and the revolving anode be free from parts which obstruct the said space, so as to cause the ore under treatment to accumulate upon the cathode, (such obstructive being, for instance, a foot-step bearing for the shaft, such as has been generally used in apparatus of the kind mentioned,) and if the opposed surfaces of the anode and cathode be perfectly parallel with each other or at the same distance apart throughout their whole effective surfaces, as then the current of electricity is equally distributed throughout the whole mass of the materials under treatment situated for the time being in the unobstructed space between the anode and the cathode. I have also found that it is necessary in order to obtain the best results from the process to cause the sludge to be constantly and gently swept from over the cathode, so as to have no tendency to settle thereupon, and so also that in the space above the anode the sludge does not acquire such a continuous rotatory motion as to cause the heavier particles to be carried outward by the centrifugal action and travel round and round and not be properly subjected to the combined action of the electric current and the other agents employed.

My improved process forming the subject-matter of this application is more fully described hereinafter, following the description of the apparatus, said apparatus being that best adapted for carrying out the process.

The apparatus, which forms the subject-matter of my divisional application, Serial No. 683,343, filed June 13, 1898, is shown in the accompanying drawings, wherein—

Figure 4:
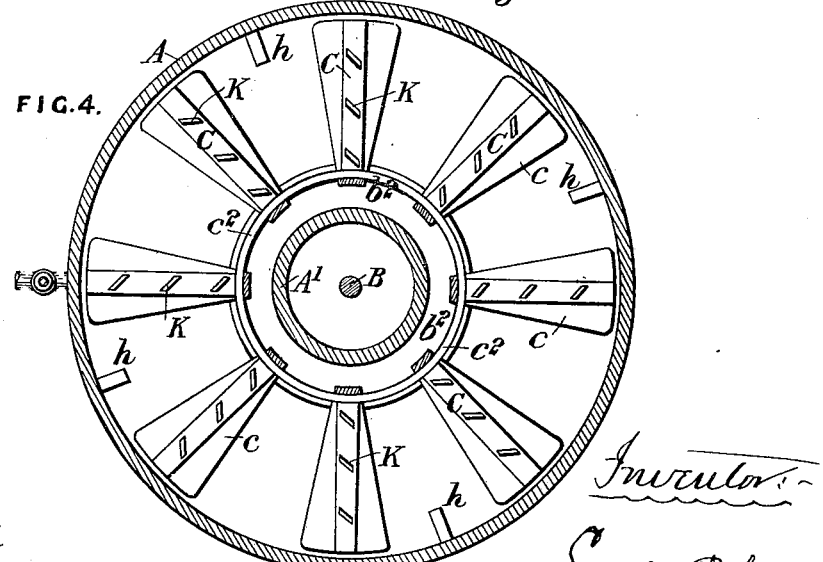

Figure 1 is a vertical section, and Fig. 2 is a plan, with the cover of the vat removed. Figs. 3 and 4 are views similar to Figs. 1 and 2, respectively, of another form of apparatus especially adapted to large vats.

I mount the revolving anode in the vat A by suspending the said anode from above, preferably by securing it to the lower extremity of a shaft B, supported in bearings $b$ above the anode and strengthened, if necessary, by stretchers $b^2$, secured at one end to the arms of the anode and at the other end to a collar secured to the shaft B. The anode consists of any suitable number of arms C, the lower surfaces of which are used as the anode or are provided with anode-plates $c$, preferably of iron or steel. The under surfaces of the said anode are throughout their whole extent parallel with the surface of the cathode D, which consists of mercury. The shaft B is in metallic contact with the anode, and the connection from the positive pole of a dynamo-electrical machine or other electric generator employed is connected to a contact-piece $e$, which bears against the said shaft, with which the anode-plates are in electric contact, while the negative pole of the said dynamo machine or generator is connected to the cathode D.

The shaft B is mounted in its bearings in such a way that it can be readily raised and lowered when required in order either to facilitate the recovery of the amalgam from the mercury cathode by removing the anode in case of making the clean-up or to regulate whenever necessary the distance of the anode from the cathode, and consequently the electrical resistance, according to the nature of the materials to be treated, which is an important consideration in effecting the proper treatment of the said materials. This may be done by a ring $b^3$, to which a suspending-chain can be attached, the said ring being connected to the shaft, so as to allow of its rotation, which rotation can be effected by any suitable means, such as by bevel-gearing or by a band or rope $g$ passed around the pulley G, secured to the top of the shaft.

In order to sweep the sludge from the cathode and prevent it from accumulating or settling thereupon, I provide the arms of the revolving anode with pins or projections K K, made of wood or other material which is a non-conductor of electricity or covered with non-conductive material, the said pins or projections projecting downward to within a short distance from the cathode, (say to within half an inch or one inch at the most,) but not so near as to disturb or touch the mercury, which otherwise would be broken up or "floured" to such an extent as to interfere seriously with the proper working of the process. The said pins or projections also extend to a short distance above the arms of the anode, so as to act upon the sludge which is above the anode.

In order to prevent the aforesaid objectionable effects of the centrifugal action, I provide the inner side of the vat with inward projections or baffles $h$, extending close to and above the path described by the extremities of the arms of the said anode, so as to break up the moving mass of sludge and prevent it acquiring a continuous revolving movement in the space above the anode. These projections or baffles may be placed vertically, as shown, or at any other suitable angle. This object is assisted by making the arms of the anode of such a length as to leave as little space as possible between their ends and the internal sides of the vat consistent with the proper passage of electricity through the charge. Generally a combination of this and the baffles $h$ is preferable in practice, the object being to force every particle in the sludge and the whole of the molecules of the solution to pass again and again from the space above the anode down into the space between the electrodes, and vice versa.

The agitation of the charge in the vat must be sufficient to maintain the sludge perfectly homogeneous throughout its mass, but it must not be such as to disturb or break up the mercury cathode.

The requisite degree of agitation can be obtained by regulating the speed at which the anode is driven; but if the rate of speed which it would be necessary to have with a certain number of arms would be such as to disturb or break up the mercury of the cathode I prefer to effect the required agitation without undue increase of speed by providing the anode with a sufficiently-increased number of arms.

I have found that for the same vat the number of revolutions of the anode which is necessary to effect a given agitation in the sludge is inversely proportional to the square roots of the numbers of the arms in the said anode. If, for instance, the original number of arms be four, then if this number be supplemented by four additional arms of equal length a similar degree of agitation can be maintained practically in the sludge by giving the anode with eight arms a number of revolutions about thirty per cent. lower than would be required to give the required degree of agitation if only the original four arms were used. This use of a sufficient number of arms to give the requisite degree of agitation without undue speed is of great importance with large vats, as in such vats if only a small number of arms were used the speed of the revolving anode would have to be increased in proportion to the diameter in order to give the requisite degree of agitation to maintain the pulverized ore in the proper state of suspension to prevent the settling of particles thereof on the cathode. The maximum speed which can be used for stirring the sludge in such large vats without disturbing the mercury of the cathode varies both with the construction of the vat and the nature of the ore or the like treated; but generally I have found that it is dangerous to run the anode at a greater speed than from eight to ten feet per second at the extremity of the arms. I find, therefore, that if the sludge cannot be conveniently agitated with less speed of the anode than eight to ten feet per second at the ends of the arms of the anode it is advantageous to use such a greater number of arms as will give the requisite agitation by driving the anode at the requisite lowness of speed. The drawings show eight arms, which will generally be sufficient for a vat of the character shown. Alternate arms may be a little shorter than the others or the same length, and the pins with which they are provided may be at distances apart the same as or different from those on the longer arms, and all or any number of the arms may be arranged to act electrically as the anode. The same or a similar result can be obtained, in the case of large vats especially, by constructing them, as shown in vertical section in Fig. 3 and plan in Fig. 4, so that the sludge is contained in an annular space between two concentric cylinders or walls A A', one inside the other and of course extending to above the level of the charge in the vat. The space inside the inner wall A' being empty will allow of the shaft B passing through it.

The revolving anode consists of arms C and anode-plates $c$ and depending pins or projections K, as in the preceding case, the arms being supported by a ring $c^2$, which is connected to the shaft by the arms $b^2$ and collar, as shown, and the said shaft is arranged as described with regard to Figs. 1 and 2, so that it can be readily lowered and raised in order to vary the distance, and consequently the electrical resistance, between the anode and cathode. In this case also the space between the anode and cathode, and also the space above the anode in which the sludge is contained, are free from any such fixed obstacle as would interfere with the thorough and effective agitation of the sludge by the revolving anode. The baffles or projections $h$, however, project from the interior of the outer wall of the vat for the purpose described with regard to the first arrangement. The parts which correspond with those shown in Figs. 1 and 2 are marked with like reference-letters. In each arrangement the pipe $i$ is for drawing off the mercury of the cathode and $j$ is a pipe for emptying the vat of its contents.

I have found that with ordinary ores, in order to avoid as far as possible the settlement of the ore or the like upon the cathode, equal weights of water and ground ore or the like will give the best effect, it being advisable to lessen the quantity of water as the specific gravity of the ores or the like under treatment increases. Such reduction of the quantity of water is also of advantage because it enables the quantity of chemical agents necessary for the proper operation of the process to be reduced proportionately.

The sludge should be in all cases sufficient in quantity to cover the anode even in the center or inward part when it is revolving.

The addition of an electrically-conductive material—such as an alkaline chlorid or a chlorid of an alkaline earth, and preferably chlorid of sodium—is advantageous, as it imparts to the sludge a degree of conductivity which it would not otherwise have. The quantity of such material employed will vary according to the distance which exists between the anode and cathode and according to the density of the electric current employed. For example, if electrodes four inches apart be used in a vat ten feet in diameter the quantity of chlorid of sodium necessary to insure a proper electric current through the sludge is generally from 0.2 to one per cent. (two-tenths of one per cent. to one per cent.) of the solution. The addition of such a material as chlorid of sodium is, moreover, advisable because I find it frequently advantageous to pass the electric current through the sludge before adding the solvent agent, and the chlorid of sodium or the like gives the requisite conductivity to the sludge to enable the electric current to pass readily therethrough before the solvent is added. The chlorid of sodium or the like also affords a practical additional means of regulating the current within the vat after the solvent is added, as when part of the solvent in the sludge is decomposed the electrical resistance increases, so that the voltage becomes higher and the amperage becomes less. By the addition of chlorid of sodium or the like the voltage is lessened and the amperage rises again, and therefore the salt can be advantageously used as a regulator of the current with beneficial results both as regards efficiency and economy.

I have found that in order to obtain the best effect from the process it is necessary to properly proportion the density of the electric current to the mean of the acting surfaces of the anode and cathode.

It is known that when electrolyzing a metal, and especially gold, from a solution upon a solid cathode the precipitation of the metal can be effected with an electric current of a very small fraction of amperes to the square foot of acting surface of the cathode; but I have found that when a mercury cathode is employed a current of one ampere and a half, or at least one ampere per square foot of the mean surface between the anode and cathode—that is to say, half the sum of the surfaces of the anode and cathode—should be employed to insure thorough and rapid precipitation of the gold.

As before indicated, I find it frequently advantageous, especially when coarse particles of gold are present in the sludge under treatment, after the vat has been charged with sludge and the anode put in motion to pass the electric current through the sludge, consisting of the pulverized ore and water with chlorid of sodium or the like added, but without the addition of the solvent agent, (such as cyanid of potassium,) the result being that the heavier particles of coarse gold in suspension are, by the combined action of gravity and the electric current, forced down to the mercury cathode, which, being always kept clean and undisturbed, as hereinbefore stated, readily amalgamates the said particles. The electric current may in such case be so passed through the sludge for, say, from a few minutes to two hours.

If the sludge be acid, owing, for instance, to the presence of free acids and acid salts in the ore or to the decomposition of neutral or basic salts by the action of the electric current, I have found that it is very advantageous to neutralize the acidity by adding to the charge a basic agent, such as caustic soda or lime or other alkali or alkaline earth, either at the commencement of the operation or after the electric current has been passed through the charge for some time in order to counteract both the apparent acidity—that is to say, the acidity in the ore at the moment it is charged in the vat—and what may be called the "latent" acidity in the charge— that is to say, the acidity which may be generated after some time by the action of the current in the sludge or by the chemical reactions therein. By this addition the consumption of the solvent is materially reduced.

The solvent agent is afterward added to the charge either dissolved in water or in the solid form. I prefer to use as the solvent an alkaline cyanid—such as potassium cyanid, for example—the quantity of the same which is most advantageous for the average qualities of ore varying from 0.05 to 0.2 per cent. (five hundredths to two-tenths of one per cent.) of the weight of the solution mixed with the ore or the like, assuming that this weight of solution be not more at the maximum than the weight of the material under treatment. When cyanogen-yielding agents other than cyanid of potassium are employed as solvents, the quantity to be used in each case is such as to always afford about the same amount of available cyanogen as is afforded by the corresponding quantity of cyanid of potassium which would be required.

With many ores it is advantageous to use in connection with the solvent an oxidizing agent—such, for example, as peroxid of sodium, (or some similar peroxid,) permanganate of potash, ferricyanid of potassium, or other ferricyanid of an alkali or an alkaline earth or the like—in order to intensify and hasten the action of the cyanogen.

I have found that greatly-improved results are obtained, especially when the materials under treatment are acid, by adding to the sludge some oxidizing compound containing or at least capable of affording a strong basic substance like soda, potash, lime, or the like—such, for example, as peroxid of sodium—in the proportion of less than five one-hundredths of one per cent. of the solution or less than one pound per ton of the charge. I have found also that it is very advantageous, especially when the materials under treatment only contain neutral or basic substances or compounds, to use picric acid (or some similar oxidizing acid compound) as the oxidizing agent by adding it to the sludge in the same aforesaid proportion of less than five one-hundredths of one per cent. of the solution or less than one pound per ton of the charge. As is known, the cyanid solvent acts on the gold partly by its own solvent action on the precious metal and partly by the action of the cyanogen which is evolved from the cyanid at the anode, but which is prevented from remaining at the anode and rises into the upper part of the charge owing to the revolution of the anode.

The precious metal is reduced to a double alkaline cyanid—such, for instance, as a double cyanid of gold and potassium, if cyanid of potassium be the solvent employed—and by the action of the anode is constantly returned to the space between the anode and cathode and very efficiently subjected to the action of the electric current and the precious-metal deposits on the mercury cathode and is amalgamated thereby, provided the density of the electric current be sufficient, alkaline cyanid being regenerated and cyanogen set free by the electrolytical action in the sludge to act upon further quantities of precious metal in the sludge.

The foregoing applies to silver, as well as to gold; but in order to recover the silver from auriferous ores containing silver or from argentiferous ores in which the silver is in a form not readily soluble by cyanid I have found that it is advantageous when applying this invention to such ores to heat to a temperature of between 80° and 100° centigrade the sludge formed of such ores, pulverized and mixed with water and chlorid of sodium or other alkaline chlorid or a chlorid of an alkaline earth and stirred by the revolving anode. This heating can be effected by any suitable means—such, for instance, as by using heated water in the making of the sludge or by injecting steam into the sludge. When the sludge is at the aforesaid temperature, an electric current of a pressure somewhat higher than that used in the treatment of ordinary gold ores is passed through the sludge for, say, from two to four hours, and the combined action of the salt and the electric current on the hot charge chloridizes the silver or compounds of silver contained in the ores, converting the silver into silver chlorid, which remains for the time being mostly suspended in the sludge, (the sodium chlorid not being present in sufficient quantity to dissolve it,) while the particles of coarse gold, if such be present, are forced down to the mercury cathode, as hereinbefore explained. After this and in order to recover the silver I allow the temperature of the sludge to lower to less than 40° centigrade, and then I pass a gentle current of electricity through the charge, and I add the solvent, such as potassium cyanid, in sufficient quantity to dissolve the silver chlorid and also the fine particles of gold, if such be present. It will also in this case be sometimes advantageous to use an oxidizing agent, such as picric acid or other oxidizing compound, in connection with the solvent by adding the said oxidizing agent to the sludge in the manner and proportion described hereabove. The soluble silver cyanid formed by the dissolving of the chlorid of silver by the cyanid is forced continually down into the space between the anode and cathode and is electrolyzed therein, as explained with regard to the cyanid of gold, and the silver is thus precipitated onto and amalgamated by the mercury cathode.

I have found that in the precipitation and recovery of silver an electric current of one ampere and a half or at least one ampere per square foot of the mean of the acting surfaces of the anode and cathode will be sufficient if the total number of ampere hours during the operation be sufficient to give a minimum of two ampere hours per ounce of silver dissolved in the sludge, and to insure a proper rate of precipitation of the silver the density of the current must be increased when required, so as to afford at least two ampere hours for each ounce of silver dissolved from the ores under treatment.

The apparatus described may also be used for separating precious metals from already-prepared solutions containing them.

Having now particularly described and ascertained the nature of this invention and the manner in which it is to be performed, I declare that what I claim is—

1. In a process such as hereinbefore explained, the treatment of the charge by first passing an electric current through an agitated mixture of pulverized ore, or the like with water, and salt, and then adding a neutralizing agent, if the sludge be acid, and afterward adding the solvent and continuing the agitation and the passage of the electric current; substantially as hereinbefore described.

2. The improvement in processes of treating ores electrolytically consisting in adding to a sludge, consisting of ore and water, a solvent and picric acid as an oxidizing agent and then passing an electric current therethrough, as set forth.

3. In a process such as hereinbefore explained, the treatment of ores by first agitating the charge consisting of pulverized ore, water and salts, heated to a temperature of from 80° to 100° centigrade, and passing therethrough an electric current of, or about the density stated, the sludge being neutralized for acid, and afterward adding the solvent agent and continuing the agitation and passage of the electric current, substantially as described.

In testimony whereof I have signed my name to this specification in the presence of two subscribing witnesses.

LOUIS PELATAN.

Witnesses:
   VICTOR BARBAS,
   EDWARD P. MACLEAN.